US010329118B2

(12) United States Patent
Pasini et al.

(10) Patent No.: US 10,329,118 B2
(45) Date of Patent: Jun. 25, 2019

(54) PASSENGER GUIDANCE SYSTEM FOR MULTICAR ELEVATOR

(71) Applicant: Otis Elevator Company, Farmington, CT (US)

(72) Inventors: Jose Miguel Pasini, Avon, CT (US); Arthur Hsu, South Glastonbury, CT (US); David Ginsberg, Granby, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 129 days.

(21) Appl. No.: 15/459,160

(22) Filed: Mar. 15, 2017

(65) Prior Publication Data

US 2017/0267487 A1 Sep. 21, 2017

Related U.S. Application Data

(60) Provisional application No. 62/308,955, filed on Mar. 16, 2016.

(51) Int. Cl.

| | |
|---|---|
| ***G05B 15/00*** | (2006.01) |
| ***B66B 3/00*** | (2006.01) |
| ***B66B 1/46*** | (2006.01) |
| ***B66B 1/24*** | (2006.01) |
| ***B66B 3/02*** | (2006.01) |
| *B66B 9/00* | (2006.01) |

(52) U.S. Cl.

CPC ............ *B66B 3/006* (2013.01); *B66B 1/2466* (2013.01); *B66B 1/468* (2013.01); *B66B 3/02* (2013.01); *B66B 9/003* (2013.01); *B66B 2201/4607* (2013.01)

(58) Field of Classification Search

CPC ......... B66B 3/006; B66B 1/2466; B66B 3/02; B66B 1/468; B66B 9/003; B66B 2201/4607

USPC .......................................................... 187/247

See application file for complete search history.

(56) References Cited

U.S. PATENT DOCUMENTS

| | | | |
|---|---|---|---|
| 6,997,288 | B2 | 2/2006 | Kakko et al. |
| 7,036,635 | B2 | 5/2006 | Rintala et al. |
| 7,040,458 | B2 | 5/2006 | Forsythe et al. |

(Continued)

FOREIGN PATENT DOCUMENTS

| | | | |
|---|---|---|---|
| JP | 2002096978 | A | 4/2002 |
| JP | 2004250193 | A | 9/2004 |
| JP | 2005240375 | A | 9/2005 |

(Continued)

*Primary Examiner* — Jeffrey Donels

(74) *Attorney, Agent, or Firm* — Cantor Colburn LLP

(57) ABSTRACT

Passenger guidance systems for a multicar elevator system and related methods are provided. The passenger guidance system includes a first landing door configured to provide access to at least one elevator car within a first lane, a second landing door configured to provide access to at least one elevator car within a second lane, a controller configured to receive information regarding the at least one elevator car within the first lane and the at least one elevator car within the second lane, and a first display controlled by the controller and configured to provide display information regarding a first elevator car in the first lane, the first elevator car of the first lane being one of (i) an elevator car currently located at the first landing door or (ii) an elevator car next to arrive at the first landing door.

20 Claims, 3 Drawing Sheets

(56) References Cited

U.S. PATENT DOCUMENTS

| | | | | |
|---|---|---|---|---|
| 7,353,915 | B2 | 4/2008 | Zaharia et al. | |
| 7,694,781 | B2 | 4/2010 | Sorsa et al. | |
| 8,397,874 | B2 | 3/2013 | de Groot | |
| 2009/0014255 | A1 * | 1/2009 | Miyajima | B66B 1/468 187/387 |
| 2010/0219025 | A1 * | 9/2010 | Laihanen | B66B 1/2458 187/387 |
| 2011/0155514 | A1 * | 6/2011 | Iwata | B66B 1/468 187/382 |
| 2011/0278101 | A1 | 11/2011 | Wu | |
| 2012/0048655 | A1 * | 3/2012 | Hsu | B66B 1/468 187/247 |
| 2012/0193173 | A1 | 8/2012 | Wu | |
| 2012/0255812 | A1 * | 10/2012 | Talonen | B66B 1/2458 187/382 |
| 2013/0068568 | A1 * | 3/2013 | Nonami | B66B 1/468 187/381 |
| 2015/0291389 | A1 * | 10/2015 | Ono | B66B 3/006 187/394 |
| 2016/0376122 | A1 * | 12/2016 | Van Dijk | B66B 1/2466 187/247 |
| 2017/0355557 | A1 * | 12/2017 | Witczak | B66B 3/02 |
| 2018/0257909 | A1 * | 9/2018 | Yoshimura | B66B 3/006 |

FOREIGN PATENT DOCUMENTS

| | | | | |
|---|---|---|---|---|
| JP | 2010064865 | A | 3/2010 | |
| WO | 2006022701 | A2 | 3/2006 | |
| WO | 2006041467 | A1 | 4/2006 | |
| WO | 2007061422 | A1 | 5/2007 | |
| WO | 2015106821 | A1 | 7/2015 | |
| WO | WO 2015165484 | A1 * | 11/2015 | B66B 1/2466 |

* cited by examiner

PASSENGER GUIDANCE SYSTEM FOR MULTICAR ELEVATOR

CROSS-REFERENCE TO RELATED APPLICATIONS

The present application claims priority from U.S. Provisional Patent Application No. 62/308,955, filed Mar. 16, 2016. The contents of the priority application are hereby incorporated by reference in their entirety.

BACKGROUND

The subject matter disclosed herein generally relates to the field of elevators, and more particularly to a multicar, ropeless elevator system and passenger guidance systems thereof.

Ropeless elevator systems, also referred to as self-propelled elevator systems, are useful in certain applications (e.g., high rise buildings) where the mass of the ropes for a roped system is prohibitive and there is a desire for multiple elevator cars to travel in a single hoistway, elevator shaft, or lane. There exist ropeless elevator systems in which a first lane is designated for upward traveling elevator cars and a second lane is designated for downward traveling elevator cars. A transfer station at each end of the lane is used to move cars horizontally between the first lane and second lane.

In conventional two button group elevator systems, hall call buttons allow users to request elevator service and go up or down in a building by selecting a destination on an operating panel located inside an elevator car. While the hall call button arrangement may be useful for many situations, larger buildings with more traffic volume may benefit from other techniques to manage passenger traffic more efficiently, such as a destination entry system. In a destination entry system, a passenger may request a desired destination on a destination entry device located outside the elevator cars. Based on the desired destination, each passenger may be assigned to a landing door (and associated elevator car) within the elevator system that most efficiently transports the passenger to a desired destination. However, in multicar elevator systems, such destination entry systems may not be possible because multiple elevator cars may service each door at a single landing, thus complicating the assignment process. That is, because multiple elevator cars may service a single landing door, with each elevator car having potentially different destination floors, assigning elevator cars or landing doors based on a desired destination may actually be variable for each door, and thus conventional systems may not provide sufficient means for assignments to users.

SUMMARY

According to one embodiment, a passenger guidance system for a multicar elevator system is provided. The passenger guidance system includes a first landing door configured to provide access to at least one elevator car within a first lane, a second landing door configured to provide access to at least one elevator car within a second lane, a controller configured to receive information regarding the at least one elevator car within the first lane and the at least one elevator car within the second lane, and a first display controlled by the controller and configured to provide display information regarding a first elevator car in the first lane, the first elevator car of the first lane being one of (i) an elevator car currently located at the first landing door or (ii) an elevator car next to arrive at the first landing door.

In addition to one or more of the features described above, or as an alternative, further embodiments of the passenger guidance system may include a second display controlled by the controller and configured to provide display information regarding a first elevator car in the second lane, the first elevator car of the second lane being one of (i) an elevator car currently located at the second landing door or (ii) an elevator car next to arrive at the second landing door.

In addition to one or more of the features described above, or as an alternative, further embodiments of the passenger guidance system may include a second elevator car in the first lane, the display configured to provide display information of the second elevator car in the first lane, wherein the second elevator car in the first lane is an elevator car that will arrive at the first landing door after the first elevator car leaves the first landing door.

In addition to one or more of the features described above, or as an alternative, further embodiments of the passenger guidance system may include that the display is configured to provide the display information of the first elevator car and the second elevator car of the first lane at the same time.

In addition to one or more of the features described above, or as an alternative, further embodiments of the passenger guidance system may include that the controller is configured to receive a user input from a user requesting to use an elevator of the multicar elevator system.

In addition to one or more of the features described above, or as an alternative, further embodiments of the passenger guidance system may include that the controller is configured to generate an assignment and display said assignment to the user, wherein the assignment comprises one of the first landing door and the second landing door based on the user input.

In addition to one or more of the features described above, or as an alternative, further embodiments of the passenger guidance system may include a second display controlled by the controller and configured to provide display information regarding a first elevator car in the second lane, the first elevator car of the second lane being one of (i) an elevator car currently located at the second landing door or (ii) an elevator car next to arrive at the second landing door.

In addition to one or more of the features described above, or as an alternative, further embodiments of the passenger guidance system may include that the user input includes a request for a user representation, wherein the controller associates the user representation with the user request for use of an elevator of the multicar elevator system, wherein the user representation is displayed on the first display to indicate which of the first landing door and the second landing door the user should wait for an elevator car.

In addition to one or more of the features described above, or as an alternative, further embodiments of the passenger guidance system may include that the controller is configured to estimate a time of arrival of each car within the first lane, the controller further configured to control the first display to display the estimated time of arrival for each elevator car within the first lane.

In addition to one or more of the features described above, or as an alternative, further embodiments of the passenger guidance system may include that the first display is configured to provide display information regarding a first elevator car in the second lane, the first elevator car of the second lane being one of (i) an elevator car currently located at the second landing door or (ii) an elevator car next to arrive at the second landing door.

In accordance with another embodiment, a method of providing guidance to passengers of a multicar elevator system is provided. The multicar elevator system includes a first landing door configured to provide access to at least one elevator car within a first lane and a second landing door configured to provide access to at least one elevator car within a second lane. The method includes receiving information regarding the at least one elevator car within the first lane and the at least one elevator car within the second lane at a controller and displaying, on a first display, display information regarding a first elevator car in the first lane, the first elevator car of the first lane being one of (i) an elevator car currently located at the first landing door or (ii) an elevator car next to arrive at the first landing door.

In addition to one or more of the features described above, or as an alternative, further embodiments of the method may include displaying, on a second display, display information regarding a first elevator car in the second lane, the first elevator car of the second lane being one of (i) an elevator car currently located at the second landing door or (ii) an elevator car next to arrive at the second landing door.

In addition to one or more of the features described above, or as an alternative, further embodiments of the method may include a second elevator car in the first lane, the method further including displaying display information of the second elevator car in the first lane, wherein the second elevator car in the first lane is an elevator car that will arrive at the first landing door after the first elevator car leaves the first landing door.

In addition to one or more of the features described above, or as an alternative, further embodiments of the method may include displaying the display information of the first elevator car and the second elevator car of the first lane at the same time.

In addition to one or more of the features described above, or as an alternative, further embodiments of the method may include receiving a user input from a user requesting to use an elevator of the multicar elevator system.

In addition to one or more of the features described above, or as an alternative, further embodiments of the method may include generating an assignment and displaying said assignment to the user, wherein the assignment comprises one of the first landing door and the second landing door based on the user input.

In addition to one or more of the features described above, or as an alternative, further embodiments of the method may include displaying, on a second display, display information regarding a first elevator car in the second lane, the first elevator car of the second lane being one of (i) an elevator car currently located at the second landing door or (ii) an elevator car next to arrive at the second landing door.

In addition to one or more of the features described above, or as an alternative, further embodiments of the method may include that the user input includes a request for a user representation, the method further comprising associating the user representation with the user request for use of an elevator of the multicar elevator system, and displaying the user representation on the first display to indicate which of the first landing door and the second landing door the user should wait for an elevator car.

In addition to one or more of the features described above, or as an alternative, further embodiments of the method may include estimating a time of arrival of each car within the first lane, and displaying the estimated time of arrival for each elevator car within the first lane.

In addition to one or more of the features described above, or as an alternative, further embodiments of the method may include displaying, on the first display, information regarding a first elevator car in the second lane, the first elevator car of the second lane being one of (i) an elevator car currently located at the second landing door or (ii) an elevator car next to arrive at the second landing door.

Technical effects of embodiments of the present disclosure include systems and processes for providing a passenger guidance system in a multicar elevator system. Further technical effects include providing accurate and clear information to a user in order to efficiently move users within a building using a multicar elevator system.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
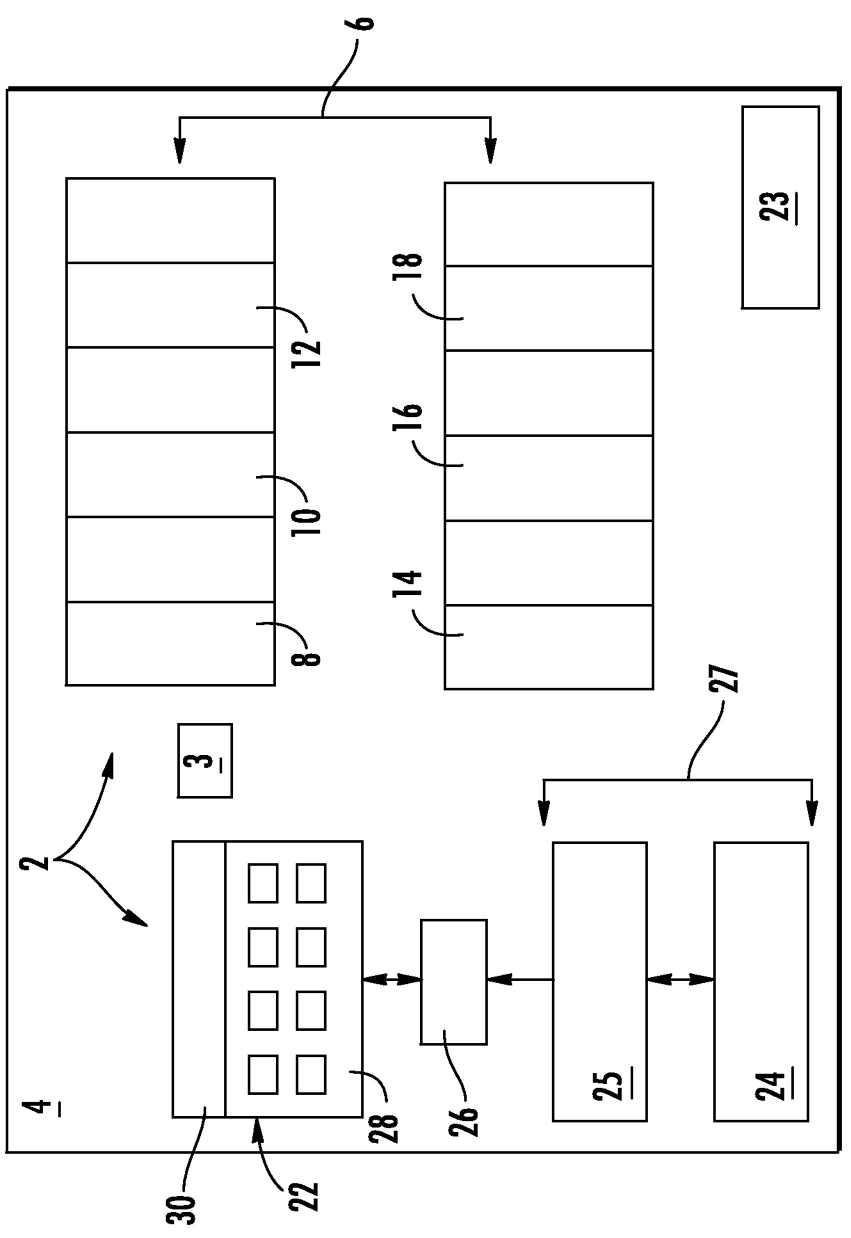
FIG. 1A is a schematic block diagram of a passenger guidance system installed in a building, in accordance with an embodiment of the present disclosure.

Referring to FIG. 1A, a schematic block diagram of an elevator control system 2 installed in a building 4 is shown, in accordance with an embodiment of the present disclosure. As shown, the elevator control system 2 may include a passenger guidance system, an elevator bank 6, an elevator controller 23, and other components. The elevator bank 6 may include a plurality of landing doors 8, 10, 12, 14, 16 and 18, which may be located in a lobby or other area of the building 4. Each landing door 8-18 may be serviced by one or more elevator cars (see, e.g., FIG. 1B, described below). The landing doors 8-18 may be selectively assigned to a user desiring access to a space within the building 4 that is serviced by the elevators of the elevator bank 6. In some embodiments, depending upon the size and needs of the building 4 where the elevator control system 2 is installed, additional elevator banks and/or destination entry devices may be provided. Furthermore, each elevator bank may have any number of landing doors and/or number of elevator cars associated therewith.

The passenger guidance system 3 may include a destination entry device 22 to facilitate assignment of the landing doors 8-18 (and associated elevator cars) to a user using the destination entry device 22. The passenger guidance system 3 may include an interface device 26 for facilitating communication between the destination entry system 22 and a security system 27. Although a particular destination entry device 22 will be described herein, those of skill in the art will appreciate that other devices and/or systems may be used without departing from the scope of the present disclosure. For example, a destination entry system may include kiosks, computer applications, mobile device applications, buttons, keycards, fobs, etc.

Users may use the destination entry device 22 to request assignment of an elevator car that will arrive at one of the landing doors 8-18, and thus deliver the user to a desired destination within the building 4. The destination entry device 22, in at least some embodiments, may include a keypad or touch screen 28 having a display 30, such as a computer, kiosk, mobile device application, etc. The destination entry device 22 may also have audio, visual, tactile, and/or other capabilities designed to provide feedback to a user. In other embodiments, other types of destination entry devices that are capable of receiving inputs from a user and further capable of providing some feedback/output back to the user may be employed as well. As noted, some embodiments, the destination entry device 22 may be a wireless communication device such as a cell phone, smart phone, tablet, etc. that may communicate wirelessly with the passenger guidance system 3.

The destination entry device 22 may be associated with other components of an elevator system, such as, but not limited to, an elevator controller 23 or other type of controller configured to operate in conjunction with the passenger guidance system 2. The elevator controller 23 may include information regarding the location of the elevator cars of the elevator system, and may communicate such information to the destination entry device 22.

Referring still to FIG. 1, an optional security system 27 may include a security system controller 25 and a credential receiver device 24 configured to receive security credential verification from a user requesting access to a particular destination within the building 4. For example, the security system 27 may be configured to verify credentials of a user that may request a destination that is a secured landing (e.g., floor) within the building 4. As used herein, a "secured" landing means that only authorized users and personnel may access that space or floor of the building 4. Relatedly, an "unsecured" landing means that no specific authorization is needed to access that space or floor of the building 4. The security system 27 may take a variety of forms, including but not limited to, a card reader, a radio frequency transceiver, a fingerprint recognition device, a voice recognition device, an electronic key reader, a keypad for receiving a security code, and/or other types of devices capable of verifying user credentials may be used.

The passenger guidance system 3 may be used to direct a user requesting a particular destination to a specific landing door 8-18 and further may indicate an elevator car to take at that specific landing door 8-18. This may be useful in a multicar elevator system, where more than one elevator car may service a single landing door.

Figure 1B:
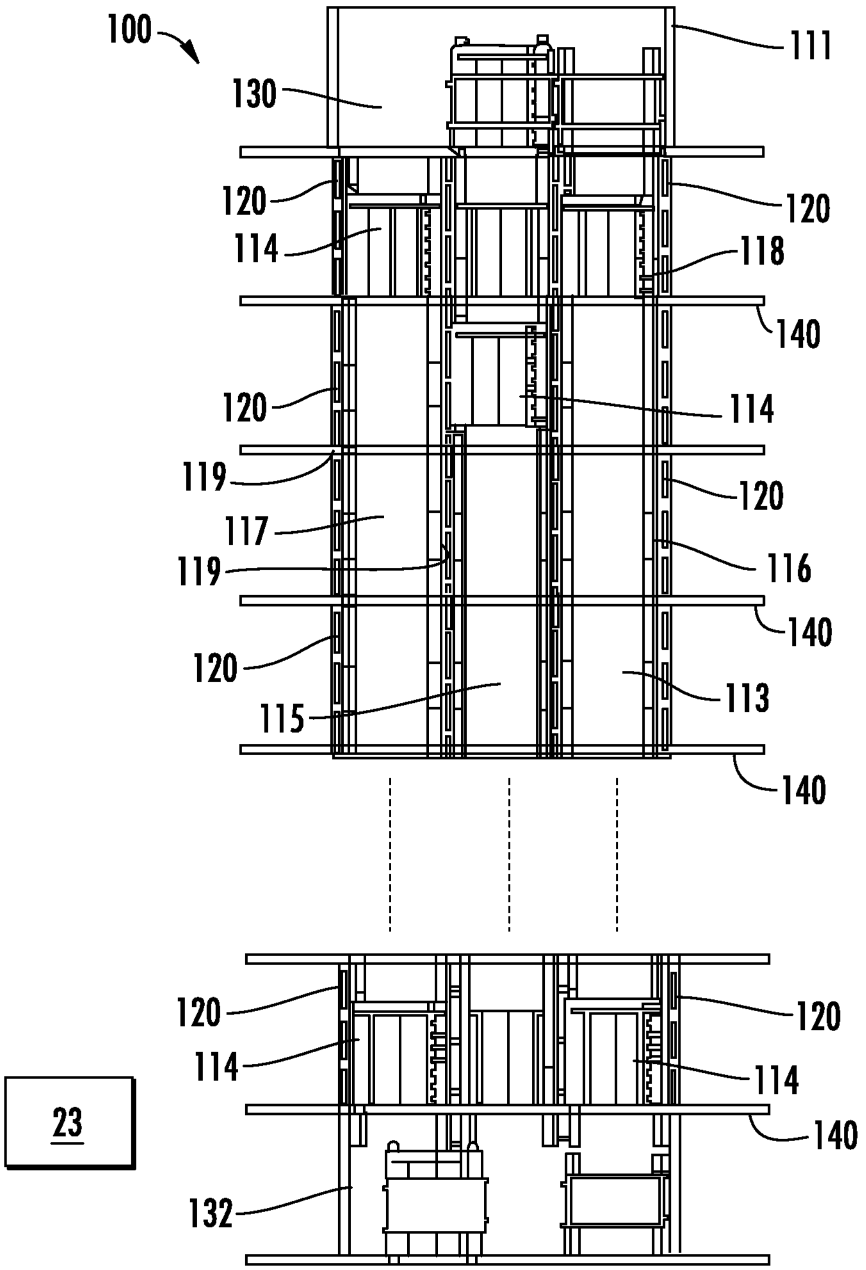
FIG. 1B depicts a multicar elevator system that may operate with the passenger guidance system of FIG. 1A.

For example, turning to FIG. 1B, an example multicar, ropeless elevator system 100 that may be employed with embodiments disclosure herein is shown. Elevator system 100 includes an elevator shaft 111 within the building 4 having a plurality of lanes 113, 115 and 117. While three lanes 113, 115, 117 are shown in FIG. 1A, it is understood that various embodiments of the present disclosure and various configurations of a multicar, ropeless elevator system may include any number of lanes.

In each lane 113, 115, 117, multiple elevator cars 114 can travel in one direction, i.e., up or down, or multiple cars 114 within a single lane may be configured to move in opposite directions. For example, in FIG. 1A elevator cars 114 in lanes 113 and 115 travel up and elevator cars 114 in lane 117 travel down. Further, as shown in FIG. 1A, one or more elevator cars 114 may travel in a single lane 113, 115, and 117. The position of the elevator cars 114 within the lanes 113, 115, 115 may be controlled and/or monitored by the elevator controller 23.

As shown, above the top accessible floor of the building is an upper transfer station 130 configured to impart horizontal motion to the elevator cars 114 to move the elevator cars 114 between lanes 113, 115, and 117. It is understood that upper transfer station 130 may be located at the top floor, rather than above the top floor. Similarly, below the first floor of the building is a lower transfer station 132 configured to impart horizontal motion to the elevator cars 114 to move the elevator cars 114 between lanes 113, 115, and 117. It is understood that lower transfer station 132 may be located on the first floor, rather than below the first floor. Although not shown in FIG. 1A, one or more intermediate transfer stations may be configured between the lower transfer station 132 and the upper transfer station 130. Intermediate transfer stations are similar to the upper transfer station 130 and lower transfer station 132 and are configured to impart horizontal motion to the elevator cars 114 at the respective transfer station, thus enabling transfer from one lane to another lane at an intermediary point within the elevator shaft 111. The elevator system 100 is configured to stop one or more elevator cars 114 at a plurality of floors 140 to allow ingress to and egress from the elevator cars 114 and movement of users between the floors.

To provide an efficient movement of passengers within the building 4, the passenger guidance system 3 may be configured to direct users to specific landing doors 8-18, and further indicate which elevator car 114 the user should board. In some embodiments, the passenger guidance system 3 may include the elevator controller 23. Further, in some embodiments, the processes and/or functionality described herein may be carried out using one or more systems, controllers, computers, etc.

For example, in operation, the passenger guidance system 3 may be configured to interact with the destination entry module 22, the controller 23, and the elevator system 110 having multiple cars per lane (or the potential for multiple cars per lane). The passenger guidance system 3 may receive a passenger destination floor entry (e.g., user data) from the destination entry system 22. That is, user data may include a desired destination as entered by a user of the destination entry module 22. The passenger guidance system 3 may then guide the user in a way to maximize dispatching efficiency of the elevator system 100 and reduce the building core space taken by the elevator system 100. For example, the passenger guidance system 3 enables maximizing passenger movement within a building and, in some embodiments, may enable fewer elevators and/or elevator lanes to be used while moving the same number or greater of passengers in the same amount of time. By increasing dispatching efficiency, including both dispatching of elevator cars to specific floors and dispatching passengers to specific elevator landing doors, building core space may be minimized.

The passenger guidance system may be configured in one of a multiple of configurations. The various configurations may be based, at least in part, on the amount of information to be conveyed to a user in order to guide them to a proper landing door and elevator car.

Figure 2:
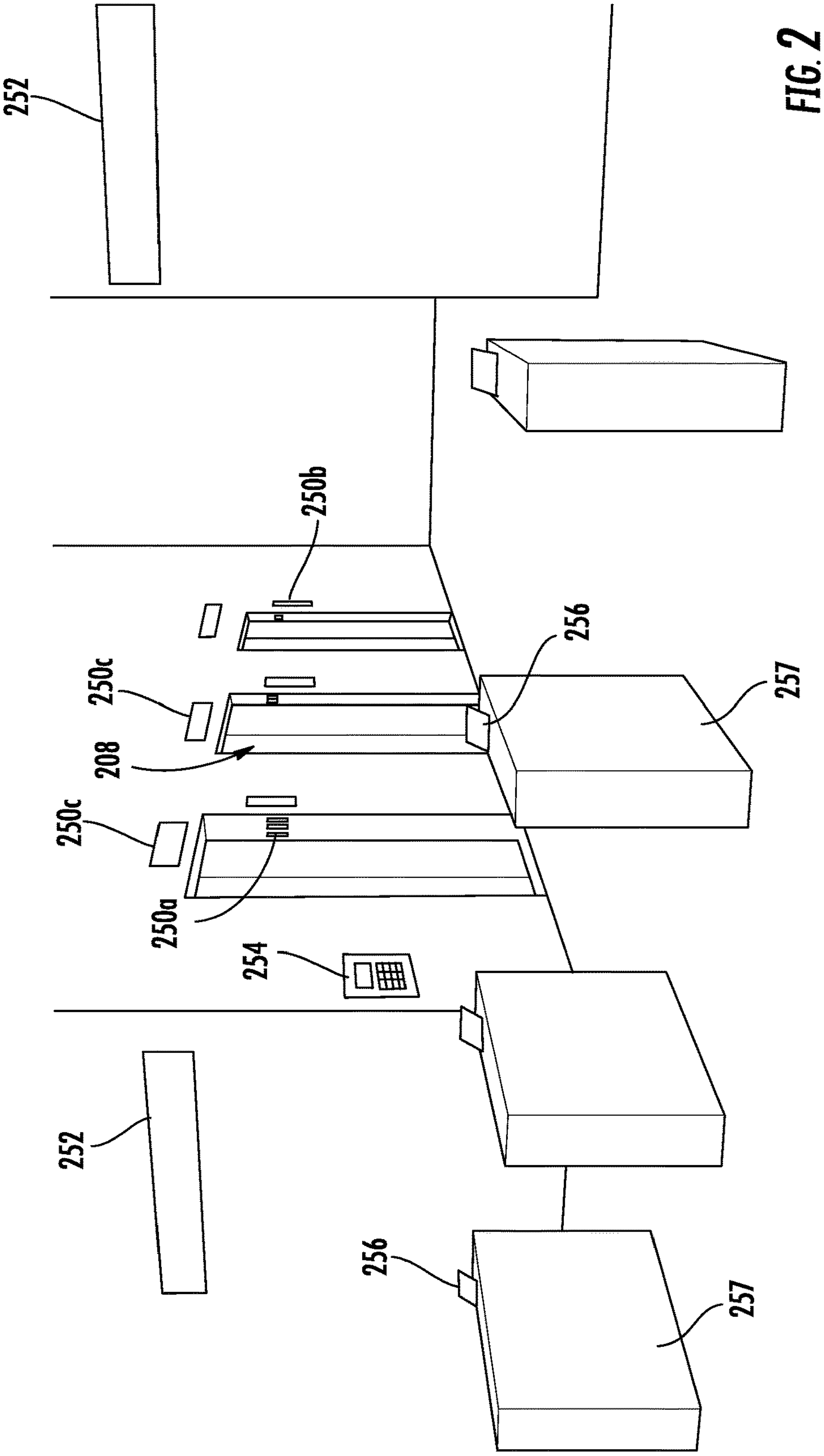
FIG. 2 is a schematic illustration of a portion of a building having an elevator bank and a passenger guidance system in accordance with an embodiment of the present disclosure.

With reference to FIG. 2, a schematic illustration of a portion of a building having an elevator bank and a passenger guidance system is shown. As shown, a plurality of landing doors 208 are located on a floor of a building and form part of an elevator bank. The landing doors 208 are configured to open and close to allow users of the elevator system to enter and exit elevator cars that are present at the landing doors 208. The landing doors 208 may remain closed when no elevator car is present at the landing doors 208. Each landing door 208 may be serviced by one or more elevator cars, with each elevator car having access to one or more other floors of the building along the same lane of the elevator system (e.g., as shown in FIG. 1B).

As shown, a number of different interactive components and/or information displays may be present. For example, each landing door 208 may have an associated door jamb signage 250*a*, an associated door side signage 250*b*, and an associated door top signage 250*c*. As will be appreciated by those of skill in the art, various configurations may include one or more of the types of signage shown in FIG. 2, or may include one or more other types of signage associated with a respective landing door. The signage 250*a*, 250*b*, 250*c* associated with a respective landing door 208 may be a lighted display that may be configured to display information to a user of the elevator system. In some non-limiting embodiments, the display information may include an indication of one or more destination floors of an elevator car to be traveled to after leaving the current landing or floor.

Additional information displays may be located in "bank" form, such as bank signage 252, destination entry panel 254, and/or turnstile display 256. Each of the bank signage 252, destination entry panel 254, and turnstile display 256 may be configured to display information on one or more elevator cars as a single instance, or in a cyclic or dynamic display. For example, the bank signage 252 may display information related to multiple elevator cars within the elevator system, and may be configured to display information regarding the elevator cars that service the elevator doors 208 near the particularly bank signage 252. The bank signage 252, in some embodiments, includes static information such as range of floors served by the elevators, etc. The destination entry panel 254 and turnstile display 256 may be configured similarly to display information on multiple elevator cars and/or multiple landing doors 208.

The signage, as used herein, may be static, semi-static, and/or dynamic signage. Static signage may be configured to indicate which floor(s) are serviced by the elevators that arrive at the particular landing door. Dynamic signage is display information that changes based on variable information, for example, the dynamic signage may change based on a particular elevator car that will be arriving at the landing door (e.g., next car will service floors 2-4, following car will service floors 5-7, etc.). A semi-static signage is somewhere between static and dynamic, wherein one or more floors for a landing door are indicated on the signage for a specific amount of time (e.g., static during morning and afternoon rushes, but then dynamic during non-busy times). In such a system, the passenger guidance system may assign each user to a specific landing door to most efficiently move users within the building and further provide display information such that a user may be informed and/or make a decision regarding a proper landing door to wait at.

Further, the destination entry panel 254 and/or turnstile display 256 may be configured to receive user input regarding a desired destination, herein after referred to as "user input device(s)." The user input devices may receive some type of input regarding a destination floor within the building, and thus may process the information to determine the most appropriate landing door 208 for the user requesting a desired floor at the user input device. As noted above, other types of user input devices may be used, such as computers, mobile applications, etc. without departing from the scope of the present disclosure.

In some configurations, the elevator bank may have elevator doors on opposing sides of the same elevator lane (e.g., a door on each side of an elevator car may be used). Thus a single lane of an elevator system may have two landing doors on a single floor of the building. Such configuration may enable a more dynamic passenger guidance system, wherein each landing door may be assigned a number, color, name, icon, etc., and the display information may indicate a particular landing door (even if located on a single lane of an elevator system).

The following are various non-limiting configurations of passenger guidance systems in accordance with embodiments of the present disclosure. The various descriptions may make reference to FIGS. 1A, 1B, and/or FIG. 2, for descriptive and illustrative purposes.

In one non-limiting configuration, each landing door may be configured with a display panel that displays display information that indicates the floors the next arriving (or currently available) elevator car will service. For example, with reference to FIG. 2, the display panel may include one or more of the door jamb signage 250*a*, the door side signage 250*b*, and/or the door top signage 250*c*. The information displayed on the display panel may include an indication of the floor(s) that the elevator car at the particular landing door will be traveling to. Further, because multiple elevator cars may be available through a single landing door (as shown in FIG. 1B), the display information may include information about each car that will be arriving at the respective landing door. In one example, a mounted display may show the destinations of each car at a respective landing door. For example, the display information may include destination information regarding a first arriving car (e.g., destinations=floors 2-4), a second arriving car (e.g., destinations=floors 5-7), and a third arriving car (e.g., destinations=floor 8), all arriving at the same landing door. The numbering of the arriving car may represent the order in time in which each car arrives at the landing door. In this configuration, the user may decide which car to enter without having to enter a destination. The user may simply search for the car which displays a floor that matches the user's desired destination. When the user enters the elevator car, the user may press a button or otherwise indicate a destination floor (if the elevator car will be traveling to more than one floor)

In another non-limiting configuration, a user may enter user information, such as a desired destination at a destination entry panel 254 and/or a turnstile display 256. The user may enter information (e.g., a destination) into a destination entry device, such as a kiosk, interface panel, mobile device application, etc. The passenger guidance system may then assign the user to a specific landing door 208. Because of the assignment nature of this configuration, all landing doors 208 may be assigned with specific destinations.

However, a new user may enter a destination not currently assigned to any of the landing doors 208. The passenger guidance system may determine if the new request can be served with the current assignments. If the current assignments can accommodate the newest request, the user will be assigned to a specific landing door 208. If the current assignments cannot accommodate the most recent user request, the system delays assignment to a later time. For example, the system may assign the user to a landing door, and indicate that the user take a later arriving elevator car at the landing door. In some embodiments, the system may direct the user to a waiting area, wherein a display may be used to indicate the user or the user's desired floor when an available elevator car will be arriving at a specific landing door. In some embodiments, the passenger guidance system may provide a notification to a user through a portable device, such as a smartphone.

In another non-limiting configuration, a user may indicate a desired destination into the passenger guidance system (e.g., at a kiosk, through a computer program, through a mobile application, etc.). The passenger guidance system will then assign the user to a specific landing door. A display at the landing door may indicate destination for the elevator cars that will be arriving at the specific landing door. For example, the landing door signage may display one or more floor numbers that will be the destination of the current elevator car. That is, when an elevator car arrives at the landing door, the signage may display the destination floor(s) of that particular elevator car. In another configuration, the signage may display the destination floor(s) of the next arriving elevator car. That is, the signage may display the destination floor(s) of an elevator car prior to the arrival of the elevator car that the landing door. In another configuration, the signage may be configured to display information regarding more than one elevator car that will arrive at the particular landing door. For example, the signage may indicate that the first car arriving will go to floors 2-4, the second car will go to floors 5-7, and the third car will go to floor 8. Thus, the signage at the landing door may be used to guide the user to enter the correct elevator car, after the passenger guidance system directs the user to the appropriate landing door.

In yet another non-limiting configuration, the passenger guidance system may be configured to receive additional information from a user, beyond just a destination. For example, the passenger guidance system, including a user input system such as a kiosk, computer, mobile application, etc., may allow a user to select a symbol to represent the particular user (e.g., the user may select an "avatar"). The selected user representation can be an image, word, number, etc. As will be appreciated by those of skill in the art, in addition to the user representation, the passenger guidance system will also receive user input information regarding a desired destination. The passenger guidance system will then display the user representation on a hall-mounted or door-mounted signage to guide the specific user to the correct landing door and elevator car. In some embodiments, the user representation may be projected on the ground or walls to guide the user to the right landing door and elevator car. That is, although multiple elevator cars may arrive at a single landing door, the passenger guidance system may employ user-specific identification information (e.g., user representation, etc.) to guide a user to the correct landing door and elevator car, when an appropriate elevator car arrives.

In one non-limiting example of this, a user may input a destination of floor 3 and select a penguin avatar. When an elevator car is about to arrive that will be traveling to floor 3, a penguin may be displayed on the signage of the appropriate hallway, and further the penguin may be displayed on signage about a specific landing door when the elevator going to floor 3 arrives. Thus, the user just needs to follow the penguin to get on the correct elevator car. Another configuration may include providing a "leader board" or other display board that will indicate the penguin should go to a specific landing door when an appropriate elevator car is about to arrive.

In yet another non-limiting configuration, a user may be assigned a specific landing door and specific car upon entering user information. That is, the user may be shown assigned information that indicates to the user the correct landing door and elevator car to enter to be able to travel to the desired input destination. The assigned information may include, but is not limited to, alphanumeric symbols, colors, etc. (e.g., "2 C" or "2 blue"). The assigned information may indicate a landing door and an elevator car that will arrive at that landing door. In such a configuration, a signage for each landing door may show the label of the landing door and of the elevator car currently serving the landing door (e.g. "2 A" for second landing door). The signage may further include the labels of all other elevator cars that have been assigned and will arrive at that landing door (e.g., "2 B", "2 C", "2 D"). The user would then board the elevator car with the label that matches the assigned information.

In yet another non-limiting configuration, the passenger guidance system may be configured similar to that described above, wherein assigned information is provided to a user (e.g., user is given information about a landing door and an elevator car label (e.g., "2 C")). The passenger guidance system may further include an estimated time of arrival that can be shown on any of the display or signage of the passenger guidance system. For example, at the assigned landing door, the signage may show or list all of the elevator cars assigned to the landing door, a list of floors served by the elevator cars, and the estimated time of arrival of each elevator car to the specific landing door. The estimated time of arrival can be numeric or some other representation, such as a progress bar, clock face, countdown, etc. The display can also show estimated times of arrival for all elevator cars that will follow beyond the current elevator car. The displayed information may include the floors that will be served by each elevator car and an estimated time of arrival for each subsequent elevator car.

Advantageously, various embodiments described herein provide passenger guidance systems that may efficiently and effectively manage users of an elevator system having multiple elevator cars that service each landing door. Further advantages include displaying information in one or more location such that a user may readily determine which landing door and which elevator car to enter to be able to reach the user's desired destination floor.

While the disclosure has been described in detail in connection with only a limited number of embodiments, it should be readily understood that the disclosure is not limited to such disclosed embodiments. Rather, the embodiments of the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments and/or features.

For example, although shown and described with various display features, those of skill in the art will appreciate that other display configurations may be used to aid a user in boarding the correct elevator car. In some configurations, a mobile device application may enable destination entry and further provide information regarding which landing door to wait at, which elevator car to board, and estimated time of arrive of the requested elevator car. Various combinations of display features and/or information delivery may be used without departing from the scope of the present disclosure.

Accordingly, the present disclosure is not to be seen as limited by the foregoing description, but is only limited by the scope of the appended claims.

What is claimed is:

1. A passenger guidance system for a multicar elevator system, the passenger guidance system comprising:

a first landing door configured to provide access to at least one elevator car within a first lane;

a second landing door configured to provide access to at least one elevator car within a second lane;

a controller configured to receive information regarding the at least one elevator car within the first lane and the at least one elevator car within the second lane;

a first display controlled by the controller and configured to provide display information regarding a first elevator car in the first lane, the first elevator car of the first lane being one of (i) an elevator car currently located at the first landing door or (ii) an elevator car next to arrive at the first landing door, and a second elevator car in the first lane, wherein the display is configured to provide display information of the second elevator car in the first lane, wherein the second elevator car in the first lane is an elevator car that will arrive at the first landing door after the first elevator car leaves the first landing door.

2. The passenger guidance system of claim 1, further comprising a second display controlled by the controller and configured to provide display information regarding a first elevator car in the second lane, the first elevator car of the second lane being one of (i) an elevator car currently located at the second landing door or (ii) an elevator car next to arrive at the second landing door.

3. The passenger guidance system of claim 1, wherein the display is configured to provide the display information of the first elevator car and the second elevator car of the first lane at the same time.

4. The passenger guidance system of claim 1, wherein the controller is configured to receive a user input from a user requesting to use an elevator of the multicar elevator system.

5. The passenger guidance system of claim 4, wherein the controller is configured to generate an assignment and display said assignment to the user, wherein the assignment comprises one of the first landing door and the second landing door based on the user input.

6. The passenger guidance system of claim 5, further comprising a second display controlled by the controller and configured to provide display information regarding a first elevator car in the second lane, the first elevator car of the second lane being one of (i) an elevator car currently located at the second landing door or (ii) an elevator car next to arrive at the second landing door.

7. The passenger guidance system of claim 4, wherein the user input includes a request for a user representation, wherein the controller associates the user representation with the user request for use of an elevator of the multicar elevator system, wherein the user representation is displayed on the first display to indicate which of the first landing door and the second landing door the user should wait for an elevator car.

8. The passenger guidance system of claim 1, wherein the controller is configured to estimate a time of arrival of each car within the first lane, the controller further configured to control the first display to display the estimated time of arrival for each elevator car within the first lane.

9. The passenger guidance system of claim 1, wherein the first display is configured to provide display information regarding a first elevator car in the second lane, the first elevator car of the second lane being one of (i) an elevator car currently located at the second landing door or (ii) an elevator car next to arrive at the second landing door.

10. A method of providing guidance to passengers of a multicar elevator system, the multicar elevator system comprising a first landing door configured to provide access to at least one elevator car within a first lane and a second landing door configured to provide access to at least one elevator car within a second lane, the method comprising:

receiving information regarding the at least one elevator car within the first lane and the at least one elevator car within the second lane at a controller; and displaying, on a first display, display information regarding a first elevator car in the first lane, the first elevator car of the first lane being one of (i) an elevator car currently located at the first landing door or (ii) an elevator car next to arrive at the first landing door, the system further comprising a second elevator car in the first lane, the method further comprising displaying display information of the second elevator car in the first lane, wherein the second elevator car in the first lane is an elevator car that will arrive at the first landing door after the first elevator car leaves the first landing door.

11. The method of claim 10, further comprising displaying, on a second display, display information regarding a first elevator car in the second lane, the first elevator car of the second lane being one of (i) an elevator car currently located at the second landing door or (ii) an elevator car next to arrive at the second landing door.

12. The method of claim 10, further comprising displaying the display information of the first elevator car and the second elevator car of the first lane at the same time.

13. The method of claim 10, further comprising receiving a user input from a user requesting to use an elevator of the multicar elevator system.

14. The method of claim 13, further comprising generating an assignment and displaying said assignment to the user, wherein the assignment comprises one of the first landing door and the second landing door based on the user input.

15. The method of claim 14, further comprising displaying, on a second display, display information regarding a first elevator car in the second lane, the first elevator car of the second lane being one of (i) an elevator car currently located at the second landing door or (ii) an elevator car next to arrive at the second landing door.

16. The method of claim 13, wherein the user input includes a request for a user representation, the method further comprising associating the user representation with the user request for use of an elevator of the multicar elevator system, and displaying the user representation on the first display to indicate which of the first landing door and the second landing door the user should wait for an elevator car.

17. The method of claim 10, further comprising estimating a time of arrival of each car within the first lane, and displaying the estimated time of arrival for each elevator car within the first lane.

18. The method of claim 10, further comprising displaying, on the first display, information regarding a first elevator car in the second lane, the first elevator car of the second lane being one of (i) an elevator car currently located at the second landing door or (ii) an elevator car next to arrive at the second landing door.

19. A passenger guidance system for a multicar elevator system, the passenger guidance system comprising:

a first landing door configured to provide access to at least one elevator car within a first lane;

a second landing door configured to provide access to at least one elevator car within a second lane;

a controller configured to receive information regarding the at least one elevator car within the first lane and the at least one elevator car within the second lane; and a first display controlled by the controller and configured to provide display information regarding a first elevator car in the first lane, the first elevator car of the first lane being one of (i) an elevator car currently located at the first landing door or (ii) an elevator car next to arrive at the first landing door, wherein the controller is configured to receive a user input from a user requesting to use an elevator of the multicar elevator system, wherein the user input includes a request for a user representation, wherein the controller associates the user representation with the user request for use of an elevator of the multicar elevator system, wherein the user representation is displayed on the first display to indicate which of the first landing door and the second landing door the user should wait for an elevator car.

20. The passenger guidance system of claim 19, further comprising a second display controlled by the controller and configured to provide display information regarding a first elevator car in the second lane, the first elevator car of the second lane being one of (i) an elevator car currently located at the second landing door or (ii) an elevator car next to arrive at the second landing door.

* * * * *